May 14, 1940.  S. A. FARRELL  2,200,952
VARIABLE PITCH PROPELLER
Filed May 28, 1938
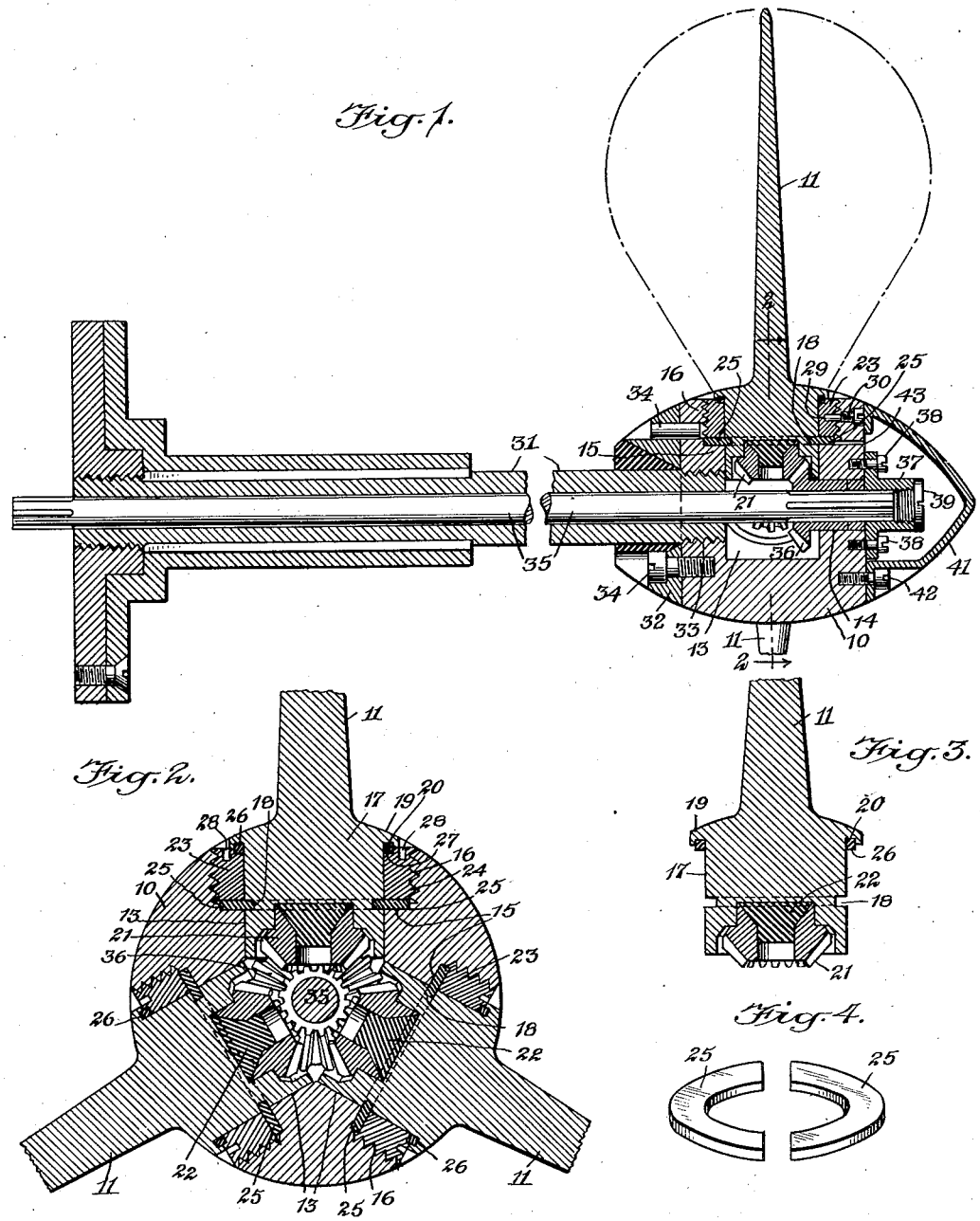
WITNESSES
INVENTOR
Stephen A. Farrell
BY
ATTORNEYS Patented May 14, 1940

2,200,952

UNITED STATES PATENT OFFICE 2,200,952

VARIABLE PITCH PROPELLER

Stephen A. Farrell, Brooklyn, N. Y.

Application May 28, 1938, Serial No. 210,644

2 Claims. (Cl. 170—173)

This invention relates to improvements in a variable pitch propeller useful with marine and other craft for the purpose of obtaining variable direction and reverse thrust.

An object of the invention is the provision of improved means for swivelly connecting the blades of a propeller with the hub in a practical manner so that the blades may be "feathered" or turned on their own axes to angularly adjust the blades for the purpose of varying the pitch thereof to obtain the desired direct or reverse thrust while the propeller is in operation.

The propeller to which the invention is applied includes a hub designed to accommodate within the same means operable to cause the adjustment of the blades simultaneously for the stated purposes. Therefore, it is another object of the inventor to provide a fluid-tight joint between certain of the parts to exclude undesirable matter from the interior of the hub to thereby prevent fouling of lubricant used and also to insure proper operation and desired movements of the parts, and also to provide a practical and durable water-tight joint for each blade of a variable pitch propeller enabling adjustments and therefore effectual operation of the propeller in propelling marine craft.

The nature of the invention and its distinguishing features and advantages will appear when the following specification is read in conjunction with the accompanying drawing, in which:

Fig. 1 is a longitudinal sectional view illustrating a propeller embodying the features of the invention;

Fig. 2 is a transverse section taken on the line 2—2 of Fig. 1;

Fig. 3 is a section of the base or root end of one of the blades; and

Fig. 4 is a perspective view of the two-part retaining ring used for swivelling a blade.

Referring now more particularly to the drawing it will be apparent that the propeller includes a hub 10 and blades 11 of which there are three in the present instance. The hub 10 has three bores or holes 13 extending radially therein and spaced equi-distantly, and also has an axial bore 14 extending therethrough which communicates with the bores 13. Each of the bores 13 provides a cross-sectionally round socket for one of the blades 11, and also provides a circular shoulder 15. The outer portion of each bore 13 is tapped to provide screw threads 16.

The base or root end 17 of each blade 11 is cross-sectionally round to loosely and turnably fit in its socket formed in the hub 10. The end 17, a suitable distance from its inner extremity has a circular groove 18 therein. In spaced relation to the groove 18 the blade has a flange 19 which is undercut to provide a groove 20. The end 17 has secured thereto in any practical manner a bevel gear 21. In the present instance said end 17 is recessed to accommodate the gear 21 and the latter is secured by welding the same to said end 17, as at 22.

In order to swivelly connect each blade 11 with the hub 10 there is provided a collar 23 having screw threads 24 complemental to the threads 16, and there is also provided a retaining ring of two parts or members 25 complemental to the groove 18. The collar 23 is designed to be removably and adjustably attached to the hub 10. To provide a fluid-tight joint in conjunction with the flange 19 use is made of a gasket 26 of suitable material such as leather. The gasket 26 fits in the groove 20 and is thick enough to project somewhat beyond the flange 19 to be received in a circular groove 27 in the collar 23. The collar 23 has holes 28 therein to accommodate a spanner wrench and also has a hole 29 for a set screw or the like 30 carried by the hub 10.

In swivelly connecting each blade 11 with the hub 10 and to form the fluid-tight joint aforesaid, an assembly of parts is made as follows. The gasket 26 is placed around the root end 17 in the groove 20. Next, the collar 23 is slipped on said end 17, the latter having a turning fit in said collar. The retaining members 25 are then placed about said end 17 disposed in the groove 18, which produces a fluid-tight contact between the gasket 26 and the flange 19, and between the gasket and the collar 23, said gasket projecting into the groove 27. The root end 17 of the blade with the parts assembled as described is entered into one of the hub sockets 13, and by the use of a suitable spanner engaged in the holes 28, the collar 23 is screwed home with its threads 24 in engagement with the threads 16 of the hub. This brings the members 25 in contact with the shoulder 15. The set screw 30 is then engaged in the hole 29 to prevent the collar 23 from turning with respect to the hub while permitting the blade to be turned or swivelled with respect to the hub 10. In this manner the three blades 11 are swivelly connected with the hub 10 for angular adjustment on their own axes.

In accordance with the invention the means for making the fluid-tight joint in conjunction with each blade is carried by said blade. In other words, when gasket or packing 26, collar 23 and retaining ring 25 are assembled on the root end 17, they become integral with the blade. The blade then may be screwed into the hub 10 as if the root 17 itself were threaded. This packing is practical and durable requiring no extra joint and can be set in place under perfect pressure.

The hub 10 is secured fast to a hollow shaft 31 which constitutes part of a means for driving or rotating the propeller. In the present instance the shaft 31 has a collar 32 welded thereto and said shaft is also in threading engagement with the hub as at 33. Fastening elements 34 carried by the collar 32 are engaged with the hub 10 as additional securing means and if desired the hub may be welded to the collar 32.

The means operable to adjust the blades 11 simultaneously includes a shaft 35 extending through the shaft 31 into the axial bore 14, and a bevel gear 36 splined on the shaft 35, said gear 36 coacting with the gears 21. A flanged sleeve 37 is secured as at 38 to the hub and an abutment 39 in the form of a screw driven in the sleeve, limits the axial movement of the shaft 35 into the hub. A cap 41 is secured as at 42 to the hub and encloses the sleeve 37 and its abutment 39.

The bores 13 and 14 afford space for grease for the gears 21 and 36. Oil fills the space afforded within the cap 41. The oil finds its way through a duct 43 in the hub about the root end 17 of each blade. In this manner the moving parts are well lubricated. The fluid-tight joint formed between each blade 11 and the hub 10 through the intervention of the gasket 26 and collar 23 excludes undesirable matter from the interior of the hub and thus insures proper operation and desired movements of the parts.

While the shaft 31 is driving the propeller the shaft 35 may be turned to operate the gears 36 and 21 to cause the desired angular adjustment of the blades 11 for the purpose of obtaining variable direct and reverse thrust.

I claim:

1. A variable pitch propeller including a hub having radial cylindrical sockets therein, a blade for each of said sockets, each blade having a cylindrical root end which loosely fits in its socket, said hub embodying a circular shoulder in the socket for each blade and the latter having a circular groove therein, semi-circular retainers complemental to said shoulder and groove, the retainers being in contact with the shoulder and extending into said groove, a collar for each blade which loosely fits on the root end of the blade, said collar being secured to the hub and being in contact with the related retainers, the provision and arrangement being such that the blades are swivelly connected with the hub for angular adjustment to vary the pitch thereof to impart the desired thrust, and means interposed between the collar and the root end of each blade in contact therewith to make a fluid-tight joint.

2. A variable pitch propeller including a hub, blades, each blade having a cylindrical root end and swivelly fitting in a socket in the hub, a flange on said root end, a ring of packing surrounding the root end of each blade in contact with said flange, a collar surrounding said root end and removably and adjustably attached to said hub, said root end having an annular groove therein, retainers adapted to hold the collar under pressure in contact with said ring, when the retainers are in position in said groove, thereby making an inside fluid-tight joint.

STEPHEN A. FARRELL.